Patented Mar. 24, 1936

2,035,393

UNITED STATES PATENT OFFICE 2,035,393

WEAR RESISTANT CAST IRON

Russell H. McCarroll and Gosta Vennerholm, Dearborn, Mich., assignors to Ford Motor Company, Dearborn, Mich., a corporation of Delaware No Drawing. Application February 9, 1934, Serial No. 710,523

2 Claims. (Cl. 75—125)

This invention relates to a new and improved cast iron particularly adapted for the manufacture of small articles, such for example as the valve push rods of automobile engines, intended for usage where hard wear resistant surfaces are desired.

It has long been a problem in the automotive industry to secure a satisfactory wear resistant material for the valve push rods and many different proposals have been made in an effort to solve such problem, such for example as using two different metals, one for the flat wearing face of the rod and a softer, more readily machineable metal for the bearing portion of the rod. Another method has been to make the rod of an integral casting, the wearing face being cast against a chill and the remainder in sand. The marked trend in the industry towards the use of higher and higher speed engines has served to accentuate the problem which is rendered more acute by the necessity for extreme accuracy in machining the push rods and great precision in their operation if the desired operating efficiency of the engine is to be secured and maintained. The problem is not restricted to push rods but is also encountered in connection with the manufacture of many different articles.

As die casting methods can be employed to produce small metal parts in quantity to precise measurements, the use of a metal having the desired wear resisting qualities would be highly desirable for the manufacture of parts of the type referred to because the parts could then be produced as castings with but a few thousands of an inch of stock provided over the required finished dimensions and this slight amount of material removed by a grinding operation without the necessity of resorting to the use of any metal cutting machining operations; it being well known that hard or tough metal which will resist the operation of cutting tools will yield to grinding.

The use of ordinary white cast iron, of the type commonly used for the manufacture of malleable iron, for valve push rods, has heretofore been suggested, but white cast iron of standard analysis has been found not to be satisfactory because of its great frangibility and consequent high scrap losses due to breakage in handling and machining and due to the fact that such iron does not have the required physical properties to resist frequent impact in operation. It is also unsuitable for die casting and, moreover, due to its extreme hardness is unsuitable for use with cooperating parts rotating in contact therewith at high speeds. In order to offset these disadvantages it has been proposed to use the white cast iron for the flat wearing portion of the push rod and to construct the rod or bearing portion of softer material, but such proposal was unfeasible because it was not possible to unite the two metals satisfactorily because of the difficulty of machining the white iron to effect a mechanical or construction joint and welding or brazing methods cannot be employed with ordinary white cast iron because such iron is very unstable and begins to break down rapidly at the high temperatures required for the welding or brazing operations, thereby resulting in an iron having a large proportion in the graphitic instead of the combined form (Fe3C) which latter is necessary to obtain the desired wearing qualities.

After a considerable period of experimentation we have succeeded in inventing and perfecting an improved metal comprising a high carbon, low silicon cast iron that meets the desired requirements. In accordance with the present invention we use a metal having an analysis falling within the following limits:

| | |
|---|---|
| C | 3.25 to 3.75% |
| Mn | 0.15 to 0.35% |
| Si | 0.75% (maximum) |
| Cu | 0.75 to 1.00% |
| P | 0.05% |
| Fe | balance |

This metal has a relatively low shrinkage due to the high carbon content, and therefore may be used most effectively for die casting in production of parts the measurements of which must be kept within precise limits.

As a result of the high carbon content which forms a solid solution with the iron and the low silicon content which increases the stability of the iron carbides, the metal has great stability under the application of heat. As a result, it is possible to use the metal to construct the flat wear resisting face portion of a push rod or other part and to unite such portion to the bearing portion of the rod by a brazing operation, the metal showing no tendency to break down at brazing temperatures as high as 2100° F.

Due to the graphitizing effect of the copper, and the effect of the copper generally on the solution, the matrix is a very fine close grained structure in which very small particles of graphite are imbedded. This imbedded graphite has marked lubricating properties.

The lower silicon content also results in securing a metal of better physical properties particularly from the standpoint of reducing the frangibility.

After the metal has been die cast in metal molds into the articles of the desired shape, the articles are preferably subjected to a strain drawing heat treatment which consists in bringing the articles up to heat at 1650° F. and permitting them to air cool to room temperature. The metal also lends itself excellently for die casting thin wall hollow castings by using a core to form the central cavity of the casting. The copper content referred to above may be omitted, but its use is preferable to secure better physical properties and to aid in facilitating the production of sound thin wall castings.

While for the purpose of clarity of disclosure we have described our invention from the standpoint of its use in connection with the manufacture of automobile valve push rods, it will be understood that the invention is not to be considered as limited to this one specific use but that, as many other uses will become readily apparent to the skilled metallurgist and those in the art to which the invention appertains, it is the purpose to include herein such other uses. It will also be understood that additions of small amounts of carbide forming elements such as chromium and molybdenum may be made in amounts of from 0.10 to 0.75% where greater wear resistant properties are desired.

We claim:

1. An article of manufacture comprising die cast cast iron having high wear resisting properties and excellent stability at elevated temperatures and of an analysis falling within the following limits:

| | |
|---|---|
| C | 3.25 to 3.75% |
| Mn | 0.15 to 0.35% |
| Si | 0.75% (maximum) |
| Cu | 0.75 to 1.00% |
| P | 0.05% |
| Fe | balance. |

2. An article of manufacture comprising die cast cast iron having high wear resisting properties and of an analysis falling within the following limits:

| | |
|---|---|
| C | 3.25 to 3.75% |
| Mn | 0.15 to 0.35% |
| Si | 0.75% (maximum) |
| Cu | 0.75 to 1.00% |
| P | 0.05% |
| Fe | balance, | the silicon, copper and carbon contents being maintained approximately in the relative proportions of 1 to 1 to 5 respectively whereby the silicon will impart stability to the iron to prevent decomposition at temperatures above the normal critical range, the carbon will secure a metal of relatively low shrinkage and the copper will increase fluidity for improved casting properties and obtain desired grain refinement.

RUSSELL H. McCARROLL.
GOSTA VENNERHOLM.